United States Patent
Le Van Suu

[11] Patent Number: 5,809,234
[45] Date of Patent: Sep. 15, 1998

[54] METHOD AND APPARATUS FOR AUTOMATIC MATCHING OF PARAMETERS OF AN INTERFACE

[75] Inventor: Maurice Le Van Suu, Romainville, France

[73] Assignee: SGS-Thomson Microelectronics S.A., Saint Genis, France

[21] Appl. No.: 604,103

[22] Filed: Feb. 20, 1996

[30] Foreign Application Priority Data

Feb. 21, 1995 [FR] France ................................ 95 01998

[51] Int. Cl.⁶ .......................... G06F 13/00; G06F 13/42
[52] U.S. Cl. ......................... 395/200.6; 395/50; 395/60; 395/61; 395/653; 395/831; 395/883; 395/885
[58] Field of Search .................... 364/514 R, 514 B, 364/550, 551.01; 370/464, 465, 466, 469; 395/50, 60, 61, 200.18, 653.831, 883, 885, 900, 200.6

[56] References Cited

U.S. PATENT DOCUMENTS

| | | | |
|---|---|---|---|
| 4,751,634 | 6/1988 | Burrus, Jr. et al. | 395/883 |
| 4,961,225 | 10/1990 | Hisano | 380/28 |
| 4,972,470 | 11/1990 | Farago | 380/3 |
| 4,998,205 | 3/1991 | Ricard | 364/464.27 |
| 5,142,528 | 8/1992 | Kobayashi et al. | 370/469 |
| 5,200,992 | 4/1993 | Yoshino | 379/93 |
| 5,206,812 | 4/1993 | Abumehdi | 364/464.2 |
| 5,457,784 | 10/1995 | Wells et al. | 395/829 |
| 5,490,134 | 2/1996 | Fernandes et al. | 370/466 |
| 5,581,261 | 12/1996 | Hickman et al. | 342/385 |
| 5,617,418 | 4/1997 | Shirani et al. | 370/465 |
| 5,635,940 | 6/1997 | Hickman et al. | 342/385 |
| 5,646,865 | 7/1997 | Alfaro et al. | 364/514 R |
| 5,649,001 | 7/1997 | Thomas et al. | 379/93.07 |
| 5,687,290 | 11/1997 | Lewis | 395/3 |

FOREIGN PATENT DOCUMENTS

| | | |
|---|---|---|
| A-0 636 967 | 2/1995 | European Pat. Off. . |
| 2 699 351 | 6/1994 | France . |
| WO-A-90 06027 | 5/1990 | WIPO . |

OTHER PUBLICATIONS

French Search Report from French Patent Application No. 95 01998, filed Feb. 21, 1995.

*Primary Examiner*—Edward R. Cosimano
*Attorney, Agent, or Firm*—Wolf, Greenfield & Sacks, P.C.

[57] ABSTRACT

Problems of matching an interface to a transmission protocol are resolved by implementing fuzzy logic. A set of fuzzy logic rules is used to select transmission parameters based upon degrees of membership of characteristics of a received signal. The characteristics may be time duration of bits, number of bits, parity value, and duration of stop bit, for example. As a result, the receiving circuits get simplified and even become universal.

49 Claims, 5 Drawing Sheets

| St | DATA ELEMENTS 7/8/9/10/11 BITS | Pa | Sp |

METHOD AND APPARATUS FOR AUTOMATIC MATCHING OF PARAMETERS OF AN INTERFACE

BACKGROUND OF THE INVENTION

1. Field of the Invention

This present invention is related to automatic matching of the parameters of an interface. It can be used especially in the field of data processing, to set up links among computers, microcomputers or peripherals, in the field of home automation for use in so-called smart buildings as well as in the field of automobiles.

2. Discussion of the Related Art

The invention shall be described in the context of a transmission protocol with a format known as the ASCII format. However, aspects of the invention can easily be applied to other protocols and other formats. In general, a message encoded in the ASCII protocol is formed by a first bit called a start bit, data elements including a parity bit and, at the end, a bit called a stop bit. The different messages are sent one after the other in one and the same order. At reception, the information must be unpacked in this order. This means that it is necessary to recognize the start bit and the stop bit, extract the data elements and verify them according to the value of the parity bit. The nature of the start bit and the stop bit, the number of data bits, the nature of the parity and the transmission rate or bit rate of the different bits are all parameters that differentiate the protocols from one another.

In order that communicating parties may be able to exchange information elements and understand one another, the transmitter and receiver must be configured so that they can carry out this recognition and processing operation. These operations of configuration generally imply human action. Indeed, these operations of configuration can be controlled by a set of small switches or dip switches that can be handled manually. These switches are generally in the rear part of the transmitter or receiver instrument and, sometimes, it is necessary to dismantle the rear face of the instrument. Quite often, it is necessary to refer to the instructions for use or to the operating instructions of the instrument to carry out the configuration. This operation of configuration furthermore may be very complex since the switches and dip switches are often difficult to reach.

This mode of information exchange has another drawback. When connection is made with another type of apparatus, the same operations of configuration have to be started all over again. This is the case for example with printers, fax machines, telephones, operators for reading measurements by RS232 links, emulators, etc.

At present, each known instrument has a dedicated interface circuit that performs this type of task and is independent of the microcontroller and the microprocessor of the instrument. As soon as the position of the connection is changed, it must be ensured that the new configuration is identical to the old one.

Furthermore, when the instrument has to be made capable of taking several different types of protocols, provision is made first to greatly increase the number of specialized interface circuits (corresponding to the number of protocols to be taken). Secondly, it is necessary to recognize the protocols received and automatically direct their reception towards a matched interface circuit. The recognition is done by specific circuits that carry out this directing operation at the same time. These specific circuits may act like filters, and only the circuit that truly corresponds to the protocol received sends the useful signals.

Figure 1:
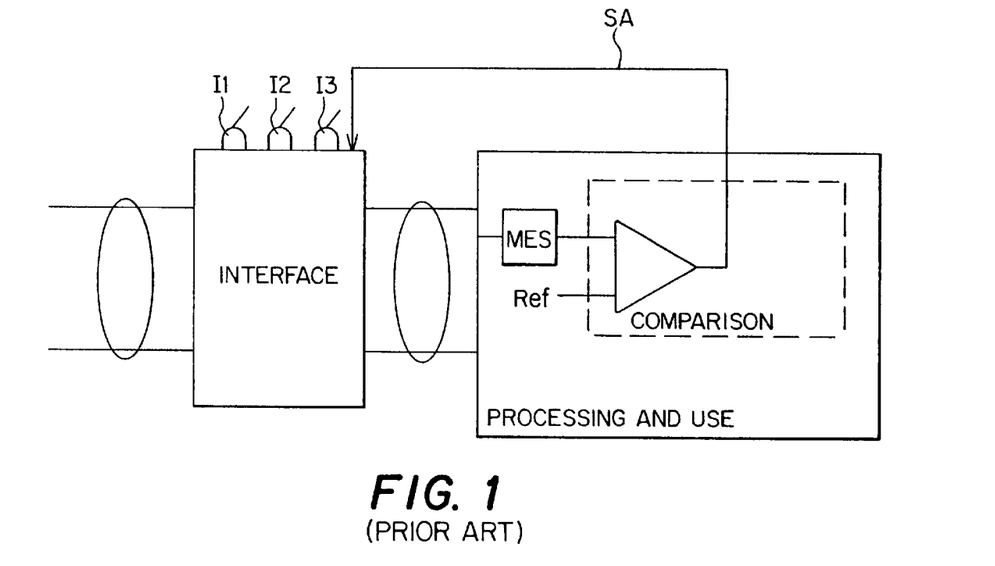
FIG. 1, already referred to, shows a prior art interface.

FIG. 1 shows another type of prior art interface circuit. The interface circuit shown has manual dip switches I1, I2, I3 as well as an automatic selection link SA. This selection link SA connects a symbolic circuit for the comparison of the transmitted message with a reference REF to a control input of the interface.

In general, the control signals transmitted by the link SA from these interface circuits are different. Consequently, it is necessary to greatly increase the number of control buses for their connection with the microprocessor or microcontroller of the instrument that processes and uses the messages received.

Most of the time, the data bus does not raise too many problems. Sometimes, however, the order of the data bits is reversed. At times, the most significant bit is to the left and at other times the most significant bit is to the right. In this case, either the interface circuit performs the reversal function or, for this is often not the case, it is for the microcontroller or processor of the instrument to carry out this type of reversal. In this specific case, a part of the resources of the microprocessor or controller is used to perform this secondary task. This is detrimental to its efficiency. Sometimes, nothing can be done for protocols with very high information bit rates.

To try to overcome this type of problem, the number of interface circuits or the number of cards dedicated to communication are greatly increased.

Present-day society has increasing need for exchanging information; whence, an ever-increasing number of communication networks exist which, by their nature, will be always different from one another. In the field of home automation using carrier current for example, the present trend is towards conveying of information elements through the network with ASCII type information elements, or Home System type information elements equivalent to ASCII type information.

In the field of automobiles, multiplexing techniques are used to save kilometers of copper wire and simplify the manufacture, maintenance, etc. of the vehicle. This is an efficient concept based on a sound approach. Unfortunately, for reasons of policy, marketing strategy and business rivalry, several types of protocol are appearing: for example the VAN, CAM, ABB and J1850 protocols.

The VAN protocol is a French protocol, the CAM and the ABB are German protocols and the J1850 comes from the United States.

Each outfitter produces specific interface circuits for its own needs. In this industry, four interface circuits for the recognition of information are appearing. A motorist who has bought a car of the make Y is required to take it for servicing and maintenance to car-dealers specializing in the make Y. Otherwise, no servicing and maintenance can be done. For example, another dealer would not be able to detect a defective element in this car with his diagnostic equipment because this equipment can understand and communicate with only one type of protocol, which is not the one chosen for cars of the make Y.

If the diagnostic instrument is to understand both protocols, it should be fitted out with two interface circuits capable of processing the information elements, understanding the message, and transferring these data elements received to the microprocessor or microcontroller. Further examples of this type may be cited.

SUMMARY OF THE INVENTION

An idea of an embodiment of the invention is based, first, on the type of interface circuit shown symbolically in FIG.

1 and, second, on fuzzy logic. This idea is to process all the protocols (for example VAN, CAM, ABB, J1850) by one circuit with a form of reasoning that uses natural human language. Thereby, the complexity of the comparison circuit of FIG. 1 is reduced, thus simplifying this circuit. As a result, after a phase for the measurement, in a circuit MES, of the characteristics of the received message, these measurement signals, rather than being applied to a specific orientation circuit, are applied to a fuzzy logic circuit whose flexibility of implementation is quite appropriate to the varied and fluctuating character of the different existing protocols.

One of the most worthwhile consequences of the invention is that it reduces the cost of the hardware because the number of connectors as well as the number of interface circuits are then reduced. For example, a single interface circuit for automobile applications, based on fuzzy logic, will be capable of processing all four types of protocols referred to above and will especially be capable of matching the transmission or bit rate. Indeed, the rate of transmission of the information elements may vary from 75 bits per second to 1 Mbits per second.

An embodiment of the invention is directed to a method for automatic matching of the transmission parameters of the protocol of binary signals that are received by an interface that is connected to a link. A set of membership functions in terms of transmission rate is stored in a memory, each of these functions comprising relationships of correspondence between values of degrees of membership and values of transmission rate. A set of rules is stored in this memory in relation with a fuzzy logic microprocessor. This set of rules enables the selection of transmission parameters of the interface according to the different membership functions. For the signals received, their different degrees of membership with respect to the different functions are measured. The interface is matched as a function of selected parameters by the application, in the microprocessor, of the rules to the degrees measured, notably by assessing a degree of likelihood of a result variable.

Similarly, in the field of home automation or data processing systems, the method may furthermore involve recognizing the transmission format at the same time as the transmission rate, which may vary from 100 bits per second to 4800 bits per second, or even more in certain cases. In this case, the method may be improved by furthermore storing, in this memory, a set of membership functions in terms of format, each of these functions comprising relationships of correspondence between degrees of membership and numbers of format bits of a typical message according to transmission protocols.

The invention can be applied to all types of transmission media: radio frequencies, infrared, coaxial cables, twisted pairs, carrier current, etc.

BRIEF DESCRIPTION OF THE DRAWINGS

The invention will be understood more clearly from the following description and from the appended figures. These figures are given purely by way of an indication and in no way restrict the scope of the invention. Of these figures.

DETAILED DESCRIPTION

Figure 2:
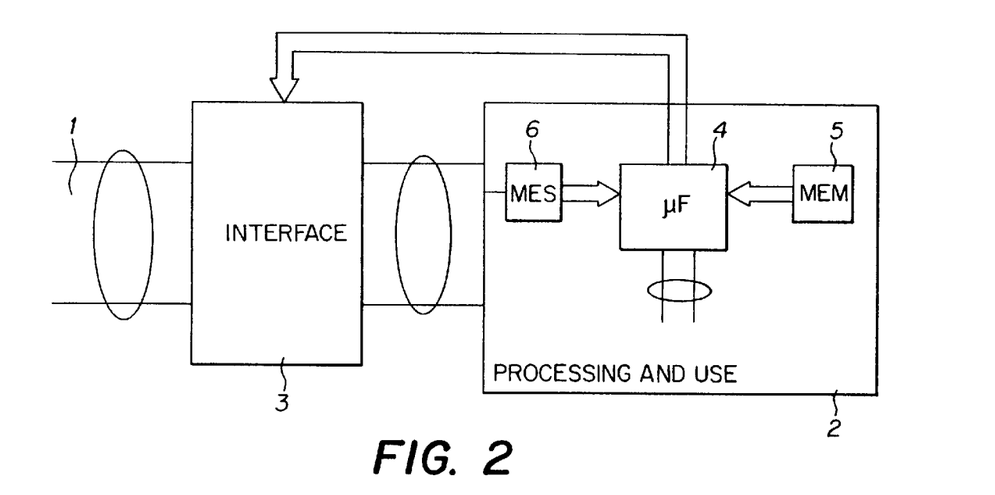
FIG. 2 is a symbolic view of a system that can be used to implement the method of one embodiment of the invention.

FIG. 2 shows a device that can be used to implement the matching method of an embodiment of the invention. In this figure, a transmission link 1 is connected to an instrument 2 for the processing and use of the signals transmitted by means of an interface 3. In one example, the instrument 2 has a fuzzy logic microprocessor ($\mu$F) 4, that can be used to implement selection rules as well as to memorize, or store, membership functions, for example in terms of bit rate. These membership functions, according to FIGS. 5A and 5B, may be address pairs formed by data elements and data element values, such that the address represents the value of a variable such that the value of the data represents a degree (for example from 0 to 1) assigned to each value of tie variable. In such all embodiment, the rules are a set of combinations of conditions of the IF-THEN type. To simplify the description, in a first stage relating to the field of automobiles, it is only the matching with the transfer rate that will be examined. The fuzzy logic microprocessor may be, for example, of the WARP 1.1 or WARP 2 type manufactured by the firm SGS Thomson Microelectronics.

In addition to the microprocessor 4, the memory 5 contains the rules, the membership functions and a prerecorded program to apply them. The instrument 2 conventionally has a measurement circuit (MES) 6 for the measurement, physically, of the received signal, of the characteristics of this signal that reveal its transmission protocol. Such a measurement circuit 6 furthermore already exists in the prior art. For example, the French patent application No. 92 15039, filed on 14 Dec. 1992, provides for a home automation type of interfacing wired circuit making use notably of a measurement of the characteristics of the signal received, a conversion of the analog signals measured into binary mode and the setting up, with a measurement circuit microprocessor, of the comparison circuit enabling the remote control of the interface. However, the programming of this measurement circuit microprocessor itself is specific in order to set up this comparison circuit and cannot easily be transposed to a great variety of situations.

Figure 3:
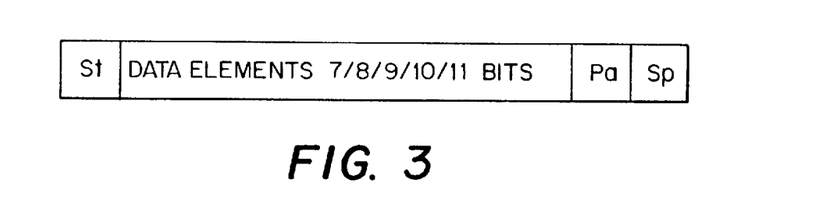
FIG. 3 shows a typical binary message.

FIG. 3 shows an exemplary type of message transmitted on a link. Such a message comprises, as a header, a starting information element called a start bit St. In the ASCII protocol, it is a first bit at 1 for which the transition of the leading edge is detected. In other protocols, for example the so-called I2C protocol, the start bit is detected by the presence of a leading edge on a data bus at the instant when the clock signal, transmitted by one of the wires of a control bus, is in a high state. Other forms of start bit are possible and are within the scope of this disclosure. For example, it is even possible to have a grouping of bits indicating the start of the message.

In the elementary ASCII format, the data elements are then encoded with variable numbers of bits: the lengths of bits most frequently chosen are 7, 8, 9, 10 and 11 bits. After such a message, a bit Pa called a parity bit is sent. Either this parity bit complements the contents of the message to make it an even-parity or odd-parity message according to the protocols chosen or it is a bit that is always at zero or always at one, depending on the protocol chosen. Finally, at the end of the message, there is a stop bit Sp. The stop bit can be recognized possibly by its form. For example, it may last longer than a normal bit. Or it may be recognized by its format, when it may itself be formed by several bits.

Figure 4:
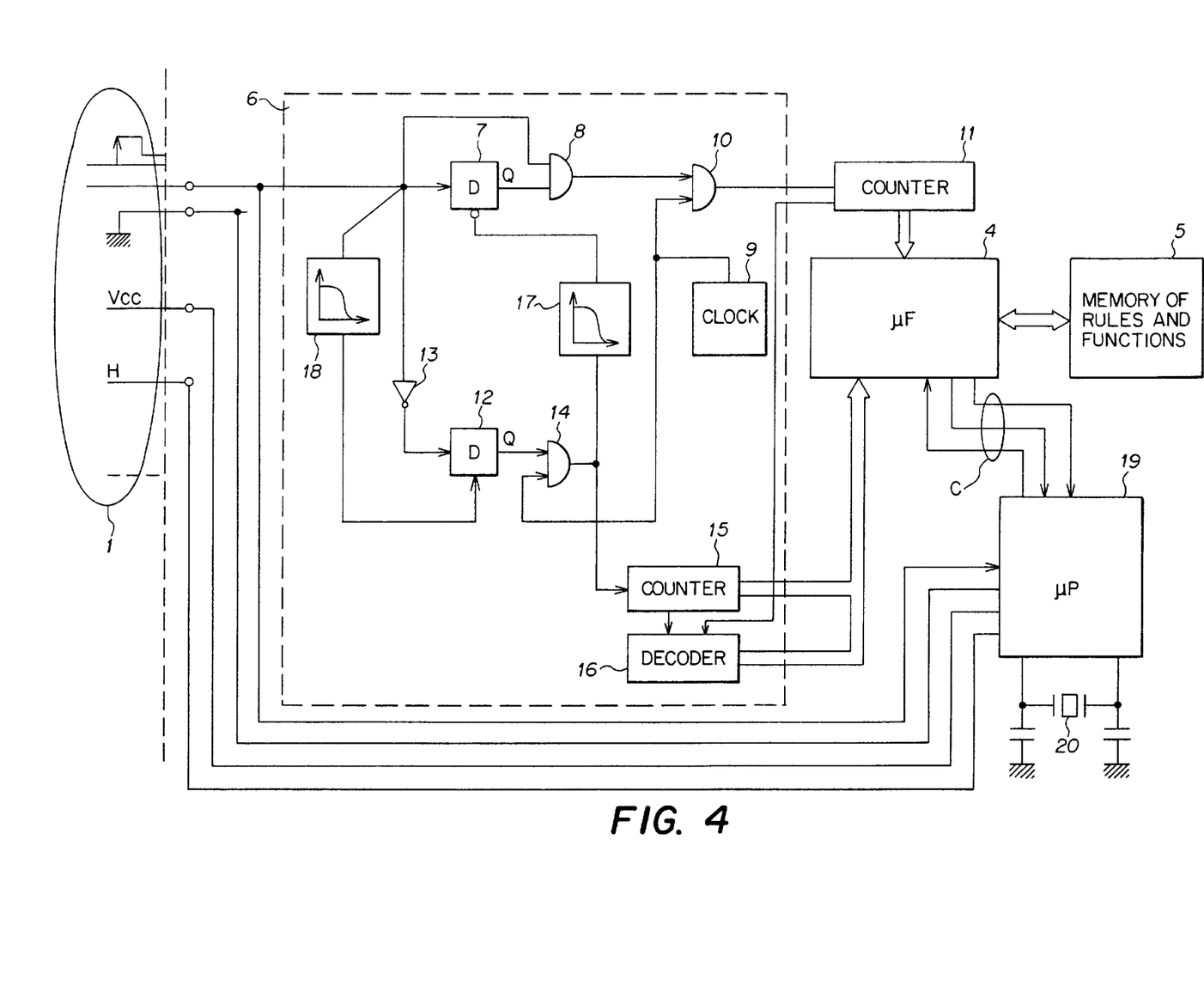
FIG. 4 is a detailed representation of a system for the implementation of the method according to an embodiment of the invention.

FIG. 4 shows a detailed exemplary view of a measurement circuit 6 connected to the link 1. This measurement circuit will be used essentially to measure the transfer rate and also the format of the bits, the value of the parity bit and the value of the stop bit. The measurement circuit 6 comprises, to this end, a D type flip-flop circuit 7 receiving, at input, the signals transmitted by one of the wires of the data bus (in the case of parallel transmission), or by the data transmission wire (in the case of serial transmission). The D type flip-flop circuit 7 sends out the leading edge of the signal that it receives at its output Q. The output Q of the flip-flop circuit 7 is connected to the input of an AND gate 8 which also receives the transmitted signal. During the first bit received, namely the start bit, the AND gate 8 delivers a state 1 at output. An output of a clock 9 as well as the output of the AND gate 8 are connected to the input of a second AND gate 10 which consequently delivers, at output, a number of pulses depending on the period of the high square-wave pulses of the input signal. This number of pulses is counted in a counter 11. At the end of the counting operation, the contents of the counter 11 are transmitted to the fuzzy logic microprocessor 4. The contents of the counter 11 may be used as an address to represent the bit duration and therefrom to deduce a degree of membership, of the period measured, in a membership function in terms of bit rate. This membership function in terms of bit rate may itself be implemented in the set of rules stored in the memory 5 for the determining, by a command C addressed to the interface, of the way in which this interface must be configured to receive and interpret the transmitted signal. Since the fuzzy logic microprocessor may be a very fast microprocessor (with an internal 50 MHz clock, for example), it may be considered that at the transmission rates referred to, the configuration of the interface as a function of the command C is then immediate.

For the measurement of the other parameters of the protocol received, another D type flip-flop circuit 12 is used in the example shown in FIG. 4. This flip-flop circuit 12 is activated by a trailing edge of the input signal by the connection of the control input of this D type flip-flop circuit 12 to the input connection by means of an inverter 13. The output Q of the flip-flop circuit 12 is itself connected at input to an AND gate 14 that also receives the clock signal 9 at another input. The output of the AND gate 14 is connected to an input of another counter 15 which carries out a counting of the bits of the message. The output of the counter 15 is connected to a decoder 16 that makes use of the result of the counting by the counter 15 by means of a decoding operation to find out the nature of the bits and the format of the message. Thus, the counter 15 counts a certain number of clock pulses 9 which, when divided by the first number of clock pulses delivered by the counter 11, gives the number of bits at zero. Then, the counter 15 again counts the duration of the bits of the message that are at one. It can also be seen that it is furthermore possible, gradually, by taking the average, to approach the measurement of the bit duration with greater precision and deduce the bit rate with greater precision. This is especially the case if the rate should change during a transmission. In practice, after the counting of the start bit, the result of the counter 11 is also decoded, for example in the decoder 16, to measure sequences of bits at one. After each counting operation, the counters 11 and 15 are reset, for example at the same time as the D type flip-flops. The decoder 16 then sends the microprocessor 4 an information element representing the number of bits 8, 9, 10 or 11, of data elements contained in the message.

For the resetting of the D type flip-flop circuits 7 and 12, two monostable circuits 17 and 18 are used, respectively connected between the resetting input of the flip-flop circuit 7 and the output of the gate 14 and between the input connection of the received signal and the resetting input of the flip-flop circuit 12.

The commands C, transmitted to a microprocessor 19 of the instrument, make it possible for this instrument, notably if it is of the type described in the French patent application referred to here above, to match its different circuits with the protocol thus recognized.

These command signals may essentially comprise a signal called a STROBE signal enabling the microprocessor that manages the interface to be informed that the data element received is available in accordance with the type of encoding and transmission recognized. The other signal is an interruption signal IRQ, that informs this microprocessor 19 that the decoding of the word has been done, whether it is a word of 8, 9, 10 or 11 bits. In return, the microprocessor 19 dispatches to the fuzzy logic microprocessor 4 an acknowledgment signal ACQ to inform it that the information has been taken into account. Rather than having a separate clock 9, it may be preferred to produce the clock signal 9 by means of a quartz element 20 attached to the microprocessor 19.

The microprocessor 19, especially if it is made in the form of an integrated circuit at the same time as the interface, may also receive the signals available on the link 1. In one embodiment, the microprocessor 4 and the microprocessor 19 are made on one and the same integrated circuit.

Figure 5A:
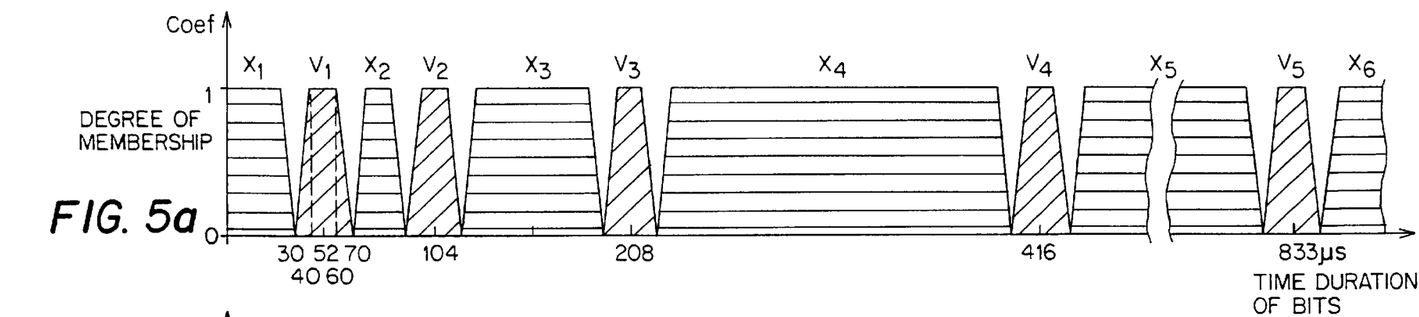
FIGS. 5A, 5B, 5C, 5D and 5E exemplify membership functions enabling the selection to be made depending on the different parameters of the protocol measured.

FIG. 5A illustrates an example, with regard to the detection of transmission rate, of the description of the membership functions stored in the memory 5. Two axes are shown symbolically in FIG. 5A, in particular the time axis and the axis of degrees of membership. The time axis shows the different possible values of the durations of bits corresponding to the high square-wave pulses of the bits transmitted. Thus, at 19200 bits per second, the curve V1 shows that a degree 1 is assigned to every value of the duration of the bit ranging from 50 microseconds to 60 microseconds. This corresponds, for example, to the standardized limits of tolerance as regards duration of the bit, in the range of 52 microseconds for transmission at 19200 bits per second.

In order to make more efficient use of the fuzzy logic technique, it may also be provided that the curve V1 will comprise rising and descending gradients between respectively 30 microseconds and 40 microseconds and 60 microseconds and 70 microseconds, in order to assign a linearly increasing or linearly decreasing degree of membership between zero and one if the value measured is beyond 40–60. Thus, if the signal measured with the counter 11 delivers a information element corresponding to 50 microseconds, it will be said that the degree of membership with respect to the function V1 for the value measured is one. If the signal measured is equal to 35 microseconds, it will be said that the degree of membership with respect to the function V1 is 0.5. At V2, V3, V4, V5, etc., nominal values of duration of the bits are respectively shown for transmission rates at 9600, 4800, 2400, 1200 etc. bits per second.

FIG. 5A furthermore also shows membership functions called X1, X2, etc. corresponding to greater bit rates of V1 or intermediate rates between the rates corresponding to Vi and Vi+1. To summarize the above example, a bit duration value equal to 52 microseconds will be interpreted as being a degree of membership with respect to the function V1 equal to 1 and a degree of membership with respect to all the other functions equal to zero. The degree of membership with respect to a particular function may be considered as a certainty that the received signal has a characteristic that corresponds to the particular function.

Figure 5B:
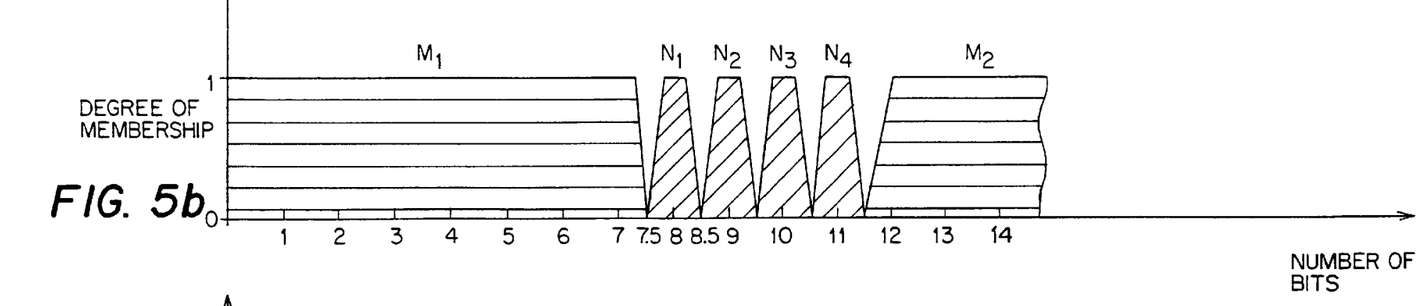

FIG. 5B illustrates an example, under the same conditions as FIG. 5A, of the membership function in terms of numbers of bits of the message. Normally, the number of bits of the message is a whole number. However, as indicated here above, the counter 15 counts bits of the clock signal 9 and not necessarily the bits actually transmitted in the message. The message may comprise bits at zero which are not themselves capable of being counted since the signal does not change its state. It is therefore possible that the number of clock bits counted, multiplied by the period of the clock signal 9 and divided by the duration of bits measured by the counter 11, is not exactly a whole number. For example, it is possible that the delays entailed by the different flip-flop circuits or the different gates cause the loss of a certain degree of precision in the counting. This is not troublesome when the membership functions are of the kind shown in FIG. 5B, where the x-axis represents the number of bits counted and the y-axis the degree of membership. For example, a degree of membership may be assigned to the function N1 (pertaining to 8 bits) if the number of bits measured ranges from 7.8 to 8.2. However, if this number of bits ranges from 7.5 to 7.8 or from 8.2 to 8.5, a proportionately reduced degree of membership will be assigned. The microprocessor 4 will therefore receive a degree of membership for each of the functions N1 to N4 represented.

Although the functions of membership N1 to N4 are shown herein as being separate, it will nevertheless be possible, in order to take account of poor conditions of reception, to further incline the gradients of this membership function in such a way that the functions are no longer separate. Thus, rather than having a degree of membership for all except one of the membership functions equal to zero, a value of a number of bits equal to 8.5 could be assigned a degree of membership at 0.25 for the function N1, 0.25 for the function N2 and 0 for the others. This makes it possible, through the application of the rules of fuzzy logic, to remove a certain degree of ambiguity which furthermore might be prohibitive in the case of the applications specific circuits of the prior art.

Figure 5C:
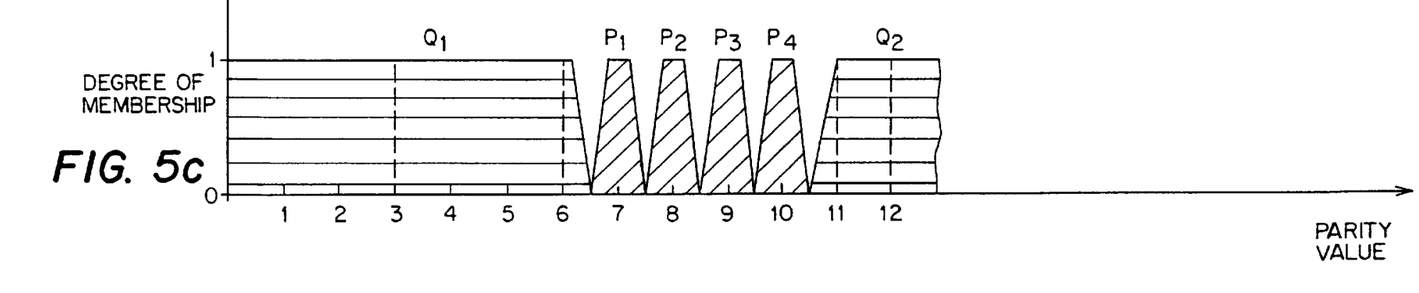

In FIG. 5C, the x-axis represents parity values and the y-axis represents degrees of membership with respect to corresponding functions. These membership functions can be used essentially for ASCII type formats. Thus, the membership function P1 measures the fact that the seventh bit of 8 bits is equal to one or zero. The function P2 measures the fact that the eighth bit of 9 is equal to one or zero and so on and so forth for the functions P3 and P4. The parity is typically the same for several successive messages. The parity bit is the one preceding the stop bit. Once this stop bit has been recognized, the format of the message, the value of the parity bit and the value of the data bits are known. It is then possible to determine whether the parity of the message is an even parity or an odd parity. For the next message, the same operation is performed. Continuing in this way, the parity will be measured, for example with a value zero, if it is an even parity and with a value one if it is odd parity. By accumulating the values measured for several successive messages, and by taking the average thereof, a value is determined that is not necessarily zero or one due to transmission noises. The membership function, in terms of fuzzy logic, thus enables a decision to be taken without ambiguity and furthermore enables the definite rejection of the messages that have the wrong parity which are therefore considered to have been wrongly received.

Figure 5D:
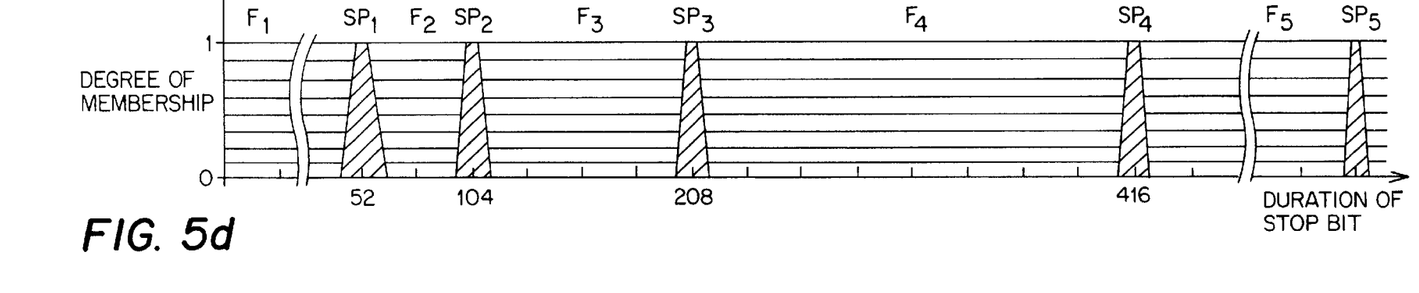

FIG. 5D illustrates an example, in the same way as for FIG. 5A, of the taking into account by the functions SP1, SP2, SP3 and so on and so forth of the duration of the stop bit and the degree of membership with respect to the different functions assigned. The duration of the stop bit provides information on the type of protocol chosen.

Figure 5E:
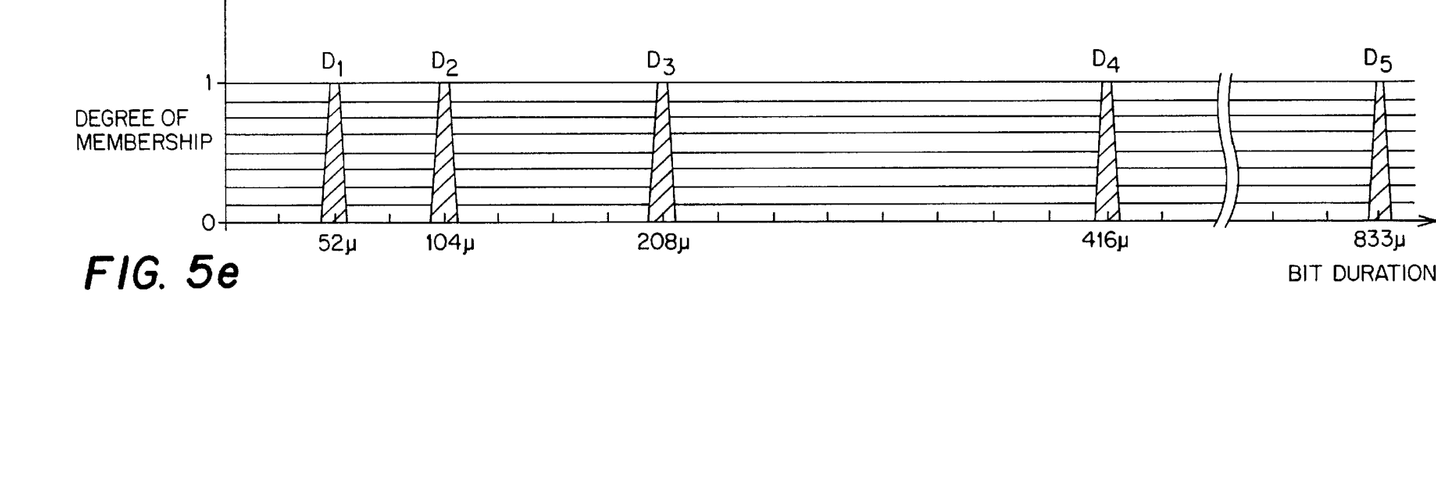

FIG. 5E illustrates an example of the output variables of the system in terms of membership functions D1 to D5 when only the bit rate is to be processed. The membership functions in terms of result can be directly interpreted as orders that can be transmitted on the command bus C. The function D1 equal to one is, for example, the sign that the rate of 19200 bits per second has been chosen. The result membership functions obligatorily have steep flanks, because in this instance the commands should not be given as half commands.

Rules of fuzzy logic recorded in the memory 5 may be of the type appearing below:

1. IF V is V1 and N is N1 and P is not P1 and SP is SP1 THEN D is D1
2. IF V is V1 and N is N1 and P is P1 and SP is SP1 THEN D is D1
3. If V is V2 and N is N2 and P is P2 and SP is not SP2 THEN D is D2
4. If V is V2 and N is N1 and P is P1 and SP is SP1 THEN D is D2
5. IF V is V2 and N is N3 and P is P3 and SP is not SPE THEN D is D2
6. IF V is V2 and N is N1 and P is P1 and SP is SP1 THEN D is D2
7. If V is V2 and N is N2 and P is P2 and SP is SP2 THEN D is D2
8. If V is V2 and N is N3 and P is P3 and SP is SP3 THEN D is D3
9. IF V is V2 and N is N1 and P is P2 and SP is not SP1 THEN D is D0.

The meaning of line 1 above is that if the degree of membership with respect to the function V1 (19200) is equal to 1, and the value of the variable N is equal to N1 (the word received is an 8-bit word), and the value of the parity P is not equal to 1, and the value of the stop bit St is in accordance with the transmission rate, then the output variable D is equal to the output D1 (the word received is at the bit rate of 19200, the parity is zero and the word is an 8-bit word). In this case, a decoder actually contained in the microprocessor 4 produces the signal C from this output D1.

For line 2 above, the word received is also in accordance with the ASCII standard, the bit rate is at 19200, the parity is 1 and the word is an 8-bit word.

Line 3 above pertains to a 9-bit word, a bit rate of 9600 and zero parity.

For line 4 above, there is an 8-bit word, a bit rate of 9600 and zero parity.

For line 5 above, there is a 10-bit word, a bit rate of 9600 and zero parity.

For lines 6, 7 and 8 above, the bit rate is 9600, the parity is equal to one and the words are 8-bit, 9-bit and 10-bit words respectively.

For line 9 above, the output is zero. This means that the message is not recognized and that it does not conform to one of the expected standards. This would not be recorded in the memory 5, because it is not possible to configure the interface of the microprocessor 19. It can thus be seen that it is easily possible to update the interface if new protocols appear, because it is enough to increase the size of the set of rules. As the case may be, it may also be necessary to create other intermediate membership functions.

Figure 6:
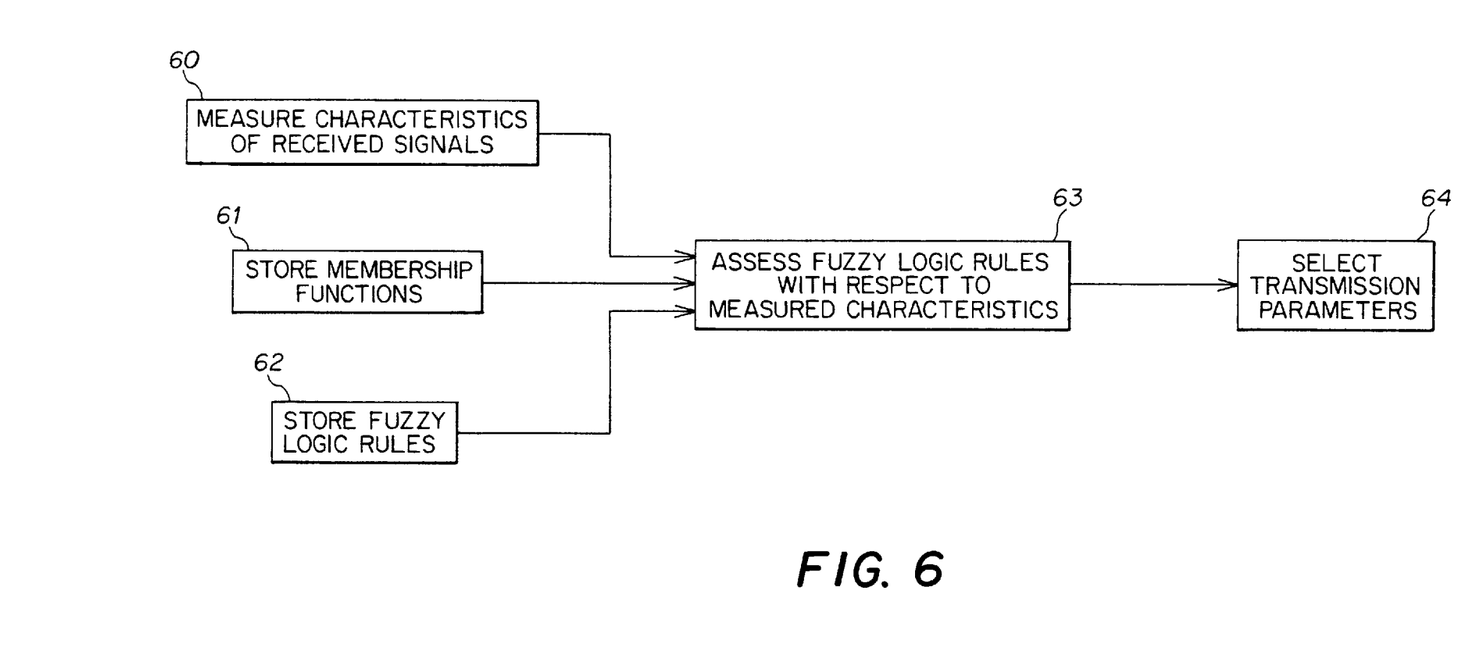
FIG. 6 shows a flowchart according to at least one embodiment of the invention.

FIG. 6 shows a flowchart according to at least one embodiment of the invention. In particular, FIG. 6 depicts a method for matching transmission parameters of an interface with transmission parameters of a protocol of binary signals received by the interface. As shown in FIG. 6, such a method may include measuring characteristics of the binary signals received to determine measured values of the characteristics of the transmission rate (step 60), storing a plurality of membership functions, each of the plurality of membership functions representing a relationship between characteristics of a transmission rate and a plurality of degrees of membership (step 61), and storing a plurality of fuzzy logic rules for selecting the transmission parameters of the interface according to the plurality of membership functions (step 62). Additionally, FIG. 6 shows a step of assessing the plurality of fuzzy logic rules with respect to the measured values, to assess a degree of likelihood of a result variable (step 63), and selecting the transmission parameters of the interface that match the transmission parameters of the binary signal received (step 64).

Having thus described at least one illustrative embodiment of the invention, various alterations, modifications, and improvements will readily occur to those skilled in the art. Such alterations, modifications and improvements are intended to be within the spirit and scope of the invention. Accordingly, the foregoing description is by way of example only, and not intended to be limiting. The invention is limited only as defined in the following claims and the equivalents thereto.

What is claimed is:

1. A method for matching transmission parameters of an interface with transmission parameters of a protocol of binary signals received by the interface, comprising the steps of:
   (a) storing a plurality of membership functions, each of the plurality of membership functions representing a relationship between characteristics of a transmission rate and a plurality of degrees of membership;
   (b) storing a plurality of fuzzy logic rules for selecting the transmission parameters of the interface according to the plurality of membership functions;
   (c) measuring characteristics of the binary signals received to determine measured values of the characteristics of the transmission rate; and
   (d) assessing the plurality of fuzzy logic rules with respect to the measured values, to assess a degree of likelihood of a result variable and select the transmission parameters of the interface that match the transmission parameters of the binary signal received.

2. The method of claim 1, wherein step (c) includes measuring the characteristics of the binary signals a plurality of times.

3. The method of claim 1, wherein step (a) includes storing at least one membership function that represents a relationship between a plurality of degrees of membership and a bit duration of a message.

4. The method of claim 1, wherein step (a) includes storing at least one membership function that represents a relationship between a plurality of degrees of membership and numbers of bits of a message.

5. The method of claim 4, wherein step (c) includes measuring the characteristics of the binary signals a plurality of times.

6. The method of claim 1, wherein step (a) includes storing at least one membership function that represents a relationship between a plurality of degrees of membership and parity bit characteristics of a message.

7. The method of claim 6, wherein step (c) includes measuring the characteristics of the binary signals a plurality of times.

8. The method of claim 1, wherein step (a) includes storing at least one membership function that represents a relationship between a plurality of degrees of membership and values of stop bit duration of a message.

9. The method of claim 8, wherein step (c) includes measuring the characteristics of the binary signals a plurality of times.

10. A method for determining transmission parameters of a digital signal, comprising the steps of:
    (a) determining at least one characteristic of the digital signal;
    (b) comparing the characteristic with a predetermined function to determine a degree of certainty that the characteristic corresponds to the predetermined function; and
    (c) determining the transmission parameters of the digital signal based upon the determined degree of certainty of the predetermined function according to a set of fuzzy logic rules.

11. The method of claim 10, wherein:
    step (b) includes comparing one characteristic with a plurality of predetermined functions to determine a plurality of degrees of certainty; and
    step (c) includes selecting parameters based upon the plurality of degrees of certainty of the plurality of predetermined functions.

12. The method of claim 10, wherein:
    step (b) includes comparing each of a plurality of characteristic with at least one corresponding predetermined function to determine at least one degree of certainty; and
    step (c) includes selecting parameters based upon the at least one degree of certainty.

13. The method of claim 10, wherein step (a) includes measuring the characteristics of the digital signal.

14. The method of claim 10, wherein step (a) includes determining a number of format bits of the digital signal.

15. The method of claim 10, wherein step (a) includes determining a time duration of a data bit of the digital signal.

16. The method of claim 10, wherein step (a) includes determining a parity value of the digital signal.

17. The method of claim 10 wherein step (a) includes determining a time duration of a stop bit of the digital signal.

18. The method of claim 10, wherein:
    step (b) includes comparing at least one characteristic with a plurality of predetermined functions to determine a plurality of degrees of certainty; and
    step (c) includes selecting parameters based upon the plurality of degrees of certainty of the plurality of predetermined functions.

19. The method of claim 18, wherein the step of selecting includes evaluating the plurality of degrees of certainty according to the set of fuzzy logic rules.

20. An apparatus for determining transmission parameters of a digital signal, comprising:
    first means for determining at least one characteristic of the digital signal;
    second means for comparing the characteristic with a predetermined function to determine a degree of certainty that the characteristic corresponds to the predetermined function; and third means for determining the transmission parameters of the digital signal based upon the determined degree of certainty of the predetermined function according to a set of fuzzy logic rules.

21. The apparatus of claim 20, wherein:

the second means includes means for comparing one characteristic with a plurality of predetermined functions to determine a plurality of degrees of certainty; and the third means includes means for selecting parameters based upon the plurality of degrees of certainty of the plurality of predetermined functions.

22. The apparatus of claim 20, wherein:

the second means includes means for comparing each of a plurality of characteristics with at least one corresponding predetermined function to determine at least one degree of certainty; and the third means includes means for selecting parameters based upon the at least one degree of certainty.

23. The apparatus of claim 20, wherein the first means includes means for measuring the at least one characteristic of the digital signal.

24. The apparatus of claim 20, wherein the first means includes means for determining a number of format bits of the digital signal.

25. The apparatus of claim 20, wherein the first means includes means for determining a time duration of a data bit of the digital signal.

26. The apparatus of claim 20, wherein the first means includes means for determining a parity value of the digital signal.

27. The apparatus of claim 20, wherein the first means includes means for determining a time duration of a stop bit of the digital signal.

28. The apparatus of claim 20, wherein:

the second means includes means for comparing at least one characteristic with a plurality of predetermined functions to determine a plurality of degrees of certainty; and the third means includes means for selecting parameters based upon the plurality of degrees of the plurality of predetermined functions.

29. The apparatus of claim 28, wherein the means for selecting includes means for evaluating the plurality of degrees of certainty according to the set of fuzzy logic rules.

30. An apparatus for determining transmission parameters of a digital signal, comprising:

a memory that stores a predetermined function that relates a degree of certainty to at least one transmission characteristic, and at least one fuzzy logic rule for evaluating the degree of certainty; and a processor, having a first input that receives at least one measured characteristic of the digital signal, a second input that receives the predetermined function, and a fuzzy logic processor that evaluates the at least one fuzzy logic rule, the processor evaluating the predetermined function with respect to the at least one measured characteristic to determine the transmission parameters of the digital signal.

31. The apparatus of claim 30, wherein the predetermined function relates a plurality of measured characteristics to the degree of certainty, the processor evaluating the plurality of measured characteristics with respect to the predetermined function to determine the degree of certainty.

32. The apparatus of claim 30, further comprising a measurement system having an input that receives the digital signal and an output that provides the at least one measured characteristic to the first input of the processor.

33. The apparatus of claim 30, wherein the at least one measured characteristic is a number of format bits.

34. The apparatus of claim 30, wherein the at least one measured characteristic is a time duration of a data bit.

35. The apparatus of claim 30, wherein the at least one measured characteristic is a parity value.

36. The apparatus of claim 30, wherein the at least one measured characteristic is a time duration of a stop bit.

37. The apparatus of claim 30, wherein:

the memory stores a plurality of predetermined functions;

the second input of the processor receives each of the plurality of predetermined functions, the processor evaluating each of the plurality of predetermined functions to determine a plurality of degrees of certainty; and the output of the processor provides the transmission parameters based upon the plurality of degrees of certainty.

38. The apparatus of claim 37, wherein:

the memory stores a plurality of fuzzy logic rules for evaluating each of the plurality of degrees of certainty; and the fuzzy logic processor evaluates the plurality of fuzzy logic rules.

39. A processing system comprising:

a first processor for performing functions and for receiving a digital signal having transmission parameters; and an interface that determines the transmission parameters for the digital signal, the interface including:

a memory that stores a predetermined function that relates a degree of certainty to a transmission characteristic, and at least one fuzzy logic rule for evaluating the degree of certainty; and a second processor, having a first input that receives at least one measured characteristic of the digital signal, a second input that receives the predetermined function, and a fuzzy logic processor that evaluates the at least one fuzzy logic rule, the processor evaluating the predetermined function with respect to the at least one measured characteristic to determine the transmission parameters of the digital signal.

40. The processing system of claim 39, wherein the predetermined function relates a plurality of measured characteristics to the degree of certainty, the second processor evaluating the plurality of measured characteristics with respect to the predetermined function to determine the degree of certainty.

41. The processing system of claim 39, wherein the interface further includes a measurement system having an input that receives the digital signal and an output that provides the at least one measured characteristic to the first input of the second processor.

42. The processing system of claim 39, wherein the at least one measured characteristic is a number of format bits.

43. The processing system of claim 39, wherein the at least one measured characteristic is a time duration of a data bit.

44. The processing system of claim 39, wherein the at least one measured characteristic is a parity value.

45. The processing system of claim 39, wherein the at least one measured characteristic is a time duration of a stop bit.

46. The processing system of claim 39, wherein the processing system is an automobile maintenance multiplexing system.

47. The processing system of claim 39, wherein the processing system is home automation system.

48. The processing system of claim 39, wherein:

the memory stores a plurality of predetermined functions;

the second input of the processor receives each of the plurality of predetermined functions, the processor evaluating each of the plurality of predetermined functions to determine a plurality of degrees of certainty; and the output of the processor provides the transmission parameters based upon the plurality of degrees of certainty.

49. The processing system of claim 48, wherein:

the memory stores a plurality of fuzzy logic rules for evaluating each of the plurality of degrees of certainty; and the fuzzy logic processor evaluates the plurality of fuzzy logic rules.

\* \* \* \* \*